United States Patent [19]

Duthoo

[11] Patent Number: 5,192,846
[45] Date of Patent: Mar. 9, 1993

[54] EQUIPMENT FOR DRILLING AND/OR CLOSING OFF BY LASER THE SEAL WELD HOLE OF A FUEL ROD

[75] Inventor: Dominique Duthoo, Romans, France

[73] Assignee: Societe Franco-Belge de Fabrication de Combustibles-FBFC, Paris, France

[21] Appl. No.: 766,747

[22] Filed: Sep. 27, 1991

[30] Foreign Application Priority Data

Oct. 8, 1990 [FR] France .................. 90 12362

[51] Int. Cl.⁵ ............................................. B23K 26/00
[52] U.S. Cl. ............................ 219/121.63; 219/121.68
[58] Field of Search .................. 219/121.68, 121.69, 219/121.63, 121.64

[56] References Cited

U.S. PATENT DOCUMENTS

| | | | |
|---|---|---|---|
| 4,020,673 | 5/1977 | Welty et al. | 176/32 X |
| 4,136,553 | 1/1979 | Jones | 176/15 X |

Primary Examiner—C. L. Albritton
Attorney, Agent, or Firm—Frishauf, Holtz, Goodman & Woodward

[57] ABSTRACT

The fuel rod (3) is inserted into the enclosure (6) thorugh a gasket (30) until the rod faces a window (32). The outlet arm (16) of the housing (5) for focusing the laser beam, is fixed to the enclosure by way of the body (35) of a solenoid plug valve (36).

Application to the plugging of the axial seal weld hole of fuel rods for nuclear reactors.

6 Claims, 1 Drawing Sheet

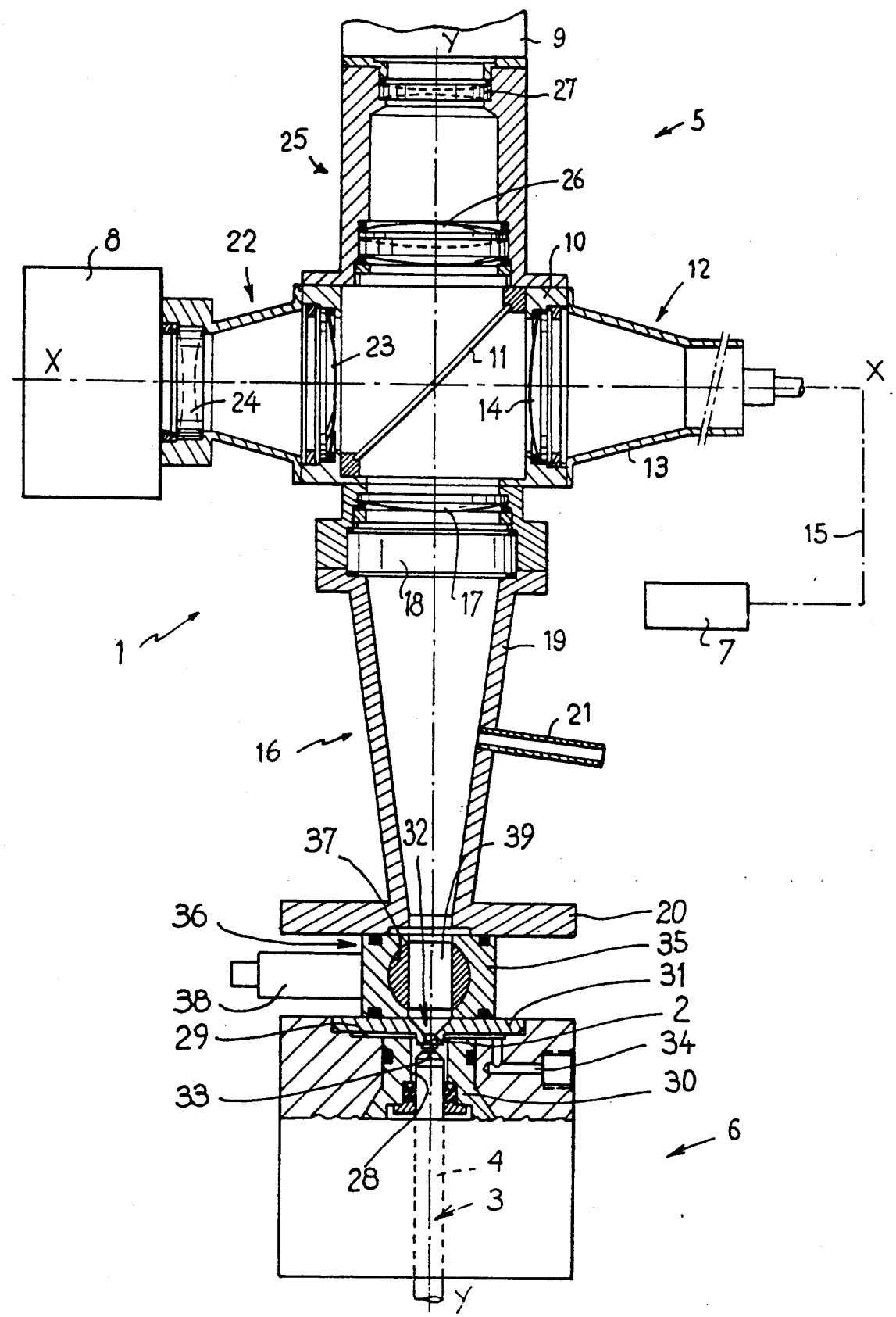

EQUIPMENT FOR DRILLING AND/OR CLOSING OFF BY LASER THE SEAL WELD HOLE OF A FUEL ROD

The present invention relates to equipment for drilling and/or closing off by laser the seal weld hole of a fuel rod.

Fuel rods used in nuclear reactors are formed from a cladding tube made of zirconium alloy at the ends of which plugs of the same material, intended for hermetically sealing it, are force-fitted and then welded.

The rods contain a stack of fuel pellets held by bearing against one of the plugs (called lower plug) with the help of a spring compressed between the fissile column and the opposite plug (upper plug). The upper plug comprises a small-diameter orifice, called "seal weld hole", enabling the fuel rod to be pressurised with helium before plugging this hole by welding, this operation is often being called "seal welding".

The length of a fuel rod is of the order of 4 meters and its diameter is approximately 10 mm for a thickness of approximately 0.6 mm.

The welds for a seal weld hole are produced in an atmosphere of hyperbaric helium and consist in collapsing in the edges of a small-diameter orifice (typically less than 0.8 mm). Their penetration must be greater than or equal to the thickness of the cladding with a high level of guarantee.

FR-A-2,305,827 proposes the drilling and closing off of this hole by means of a laser beam, without describing the actual technology.

The object of the invention is to provide equipment enabling seal weld holes to be automatically drilled and/or closed off with a low consumption of helium.

For this purpose, the subject of the invention is an item of equipment for drilling and/or closing off by laser the seal weld hole of a fuel rod, comprising:

a housing for focusing a laser beam, comprising an outlet arm into which opens a pipe for gas under pressure;

an enclosure which comprises a window for inlet of the laser beam and a passage for inserting and for positioning a fuel rod facing the window, this passage being equipped with a sealing gasket; and a stop valve interposed in a sealed manner between an end flange of the outlet arm of the housing and the window of the enclosure.

According to the features of the present invention:

the seal weld hole of the rod is axially arranged and, the window forms a bearing seat for the rod;

the volume of the enclosure situated between the window and the gasket is connectable to one of a source of purge gas, to a vacuum pump and to the atmosphere; and the stop valve is of the rotating plug type.

An embodiment of the invention will now be described with reference to the attached drawing, the single figure of which shows, in longitudinal cross-section, an item of equipment for closing off a seal weld hole according to the invention.

The equipment 1 shown in the drawing is intended for closing off by laser the seal weld hole (not visible in the drawing) provided axially in a frustoconical plug 2 of a series of fuel rods 3. The rods comprise on the outside a cladding 4 at each end of which a plug has been previously fitted and welded. The equipment 1 essentially comprises a housing 5, an enclosure 6, a pulsed YAG laser source 7, an energy or power detector 8 and a camera 9.

The housing 5 comprises a parallelepipedal central body 10 in which a reflecting mirror 11, inclined at 45°, is mounted. This housing is open at four successive faces from which four arms extend:

an inlet arm 12 of axis X—X, assumed to be horizontal, comprising a tubular support 13 and a collimating lens 14 adjacent to the body 10. An optical fiber 15 leaves from the laser source 7 and terminates in the support 13 where its end is positioned along the axis X—X;

an outlet arm 16 on axis Y—Y, assumed to be vertical, comprising successively, starting from the body 10, a focusing lens 17, a port 18 and a muff 19 whose end opening comprises a fixing flange 20. The port 18 is mounted with a seal between two flanges of the arm 16 which are assembled together, and a pipe 21 for supplying helium at approximately 30 bar enters into the muff 19 just below this port;

a laser beam control arm 22, of axis X—X, situated opposite the arm 12. This arm 22 comprises converging 23 and diverging 24 optical lenses permitting the diameter of the beam to be adapted to the size of the detector 8, the latter being fixed to the end of the arm 22; and a visual control arm 25, of axis Y—Y, situated opposite the arm 16. This arm 25 comprises converging 26 and diverging 27 optical lenses, enabling the diameter of the focusing lens of the beam to be adapted to the objective of the camera 9, the latter being fixed to the end of the arm 25.

The enclosure 6, on the same general axis Y—Y as the muff 19, is disposed beneath the housing 5. It comprises a cylindrical passage 28 entering a stepped countersunk region 29 open towards the top. The passage 28 is provided, at a short distance from this countersunk region, with an annular gasket 30 of the type having lips.

A bearing plate 31 is fixed in a sealed manner in the outer, larger diameter, portion of the countersunk region 29. This plate comprises in its center, a hole 32 of convergent-divergent shape which constitutes the window of the enclosure. The internal portion 33 of this window which forms a seat conjugate with the plug 2 of the fuel rods comprising the central seal weld hole to be closed off.

A pipe 34 of the enclosure 6 enters the internal portion of the countersunk region 29 and may, by means of a directional valve not shown, be selectively connected to a source of helium under a pressure slightly greater than atmospheric pressure, to a vacuum pump or to the atmosphere, or else be closed.

The flange 20 of the muff 19 is fixed in a sealed manner to the enclosure 6 by way of the parallelepipedal body 35 of a solenoid stop valve 36 having a spherical valve plug 37 and a rotary actuating shaft 38.

In service, the valve 36 is closed and, in the absence of any rod, the enclosure 6 is subjected to a purge with low-pressure helium via the pipe 34, the countersunk region 29 and the passage 28. A fuel rod 3 is inserted into the passage 28, through the seal 30, until its plug 2 bears on the seat 33 and is then held by clamping means (not shown) provided in the enclosure. The pipe 34 is connected to the vacuum pump for evacuation of the air contained in the rod 3 and then closed, this evacuation phase being optional however.

The valve 36 is opened, which completely fills the rod with helium at approximately 30 bar and offers a passage for the laser beam, through the cylindrical passage 39 of the valve plug, up to the seal weld hole. The closing of the seal weld hole is then carried out by means of the pulsed laser beam which is conveyed by the optical fiber 15, collimated by the lens 14, reflected by the mirror 11 and focused by the lens 17 onto the hole to be plugged. Then the valve 36 is closed again, the pipe 34 is set to atmosphere, the rod 3 is removed and the purge of the enclosure with helium via the low pressure circuit is re-established.

The mirror 11 is a dichroic mirror which reflects the majority (for example 97%) of the incident laser beam ($\lambda = 1.06$ micron) and allows a small fraction of it to pass towards the detector 8. In addition, this mirror is transparent to visible light, which enables the camera 9 to monitor, by reflex focusing and composing, the plug 2 of the rod 3 through the lenses 27, 26 and 17, the mirror 11, the port 18 and the window 32 when the valve 36 is open.

The detector 8 enables the laser beam to be monitored and, for example, an alarm to be triggered in the event of deterioration of an optical component or a malfunction of the laser source. The camera 9 makes it possible to check the positioning of the rod in the enclosure 6 and, if appropriate, to trigger an alarm as well.

The rigidity of the entire equipment, constituted by metallic components rigidly fixed to each other and comprising optical components fixed rigidly in the housing 5, ensures excellent focusing of the beam, in a foolproof manner, at the location of the weld and welds of high quality and good reproducibility. However, the equipment is demountable and permits easy maintenance and, especially, demounting and easy maintenance of the port 18.

By virtue of the arrangement described comprising the valve 36 between the housing and the enclosure, the dead volume of helium under pressure surrounding the plug 2 and the adjacent portion of the rod is reduced to a strict minimum, and this also applies to the consumption of helium by the unit.

As is understood, the same equipment may, if desired, also serve to drill the seal weld hole of each fuel rod.

It should be noted that, as a variant, the solenoid plug valve 36 may be replaced by any other type of solenoid valve which, in the open position, offers a sufficient passage for the focused laser beam.

I claim:

1. Equipment for one of drilling and closing off a seal weld hold in a fuel rod with a laser beam, comprising:
    a housing for focusing a laser beam, said housing including:
        an outlet arm; and
        a pipe connected to said outlet arm for supplying a pressurized gas to said outlet arm;
    an enclosure having:
        a window for admitting the laser beam into the enclosure;
        a passage for receiving said fuel rod and for positioning said fuel rod therein to face said window; and
        a sealing means for sealing said passage; and
    a stop valve interposed between and sealing an end flange of said outlet arm of said housing and said window of said enclosure.

2. The equipment according to claim 1, further comprising:
    a seal weld hole formed in said fuel rod;
    said seal weld hole being formed at a longitudinal end portion of said fuel rod;
    said fuel rod being positioned in said passage so that said window forms a bearing seat for said fuel rod.

3. The equipment according to claim 1, wherein a volume in the enclosure, defined between said window and said sealing means, is connectable to one of:
    a source of purge gas;
    a vacuum pump; and
    an atmospheric pressure.

4. The equipment according to claim 2, wherein a volume in the enclosure, defined between said window and said sealing means, is connectable to one of:
    a source of purge gas;
    a vacuum pump; and
    an atmospheric pressure.

5. The equipment according to claim 1, wherein the stop valve comprises a rotating pump type valve.

6. The equipment according to claim 2, wherein the stop valve comprises a rotating type pump valve.

* * * * *